(12) United States Patent
Edwards

(10) Patent No.: US 11,941,894 B2
(45) Date of Patent: Mar. 26, 2024

(54) INFRARED LIGHT SOURCE PROTECTIVE SYSTEM

(71) Applicant: SEEING MACHINES LIMITED, Fyshwick (AU)

(72) Inventor: Timothy James Henry Edwards, Braddon (AU)

(73) Assignee: SEEING MACHINES LIMITED, Fyshwick (AU)

( * ) Notice: Subject to any disclaimer, the term of this patent is extended or adjusted under 35 U.S.C. 154(b) by 156 days.

(21) Appl. No.: 17/048,894

(22) PCT Filed: Apr. 18, 2019

(86) PCT No.: PCT/AU2019/050347
§ 371 (c)(1),
(2) Date: Oct. 19, 2020

(87) PCT Pub. No.: WO2019/200434
PCT Pub. Date: Oct. 24, 2019

(65) Prior Publication Data
US 2021/0365702 A1  Nov. 25, 2021

(30) Foreign Application Priority Data
Apr. 19, 2018 (AU) .................. 2018901300

(51) Int. Cl.
*G06V 20/00* (2022.01)
*G06F 18/22* (2023.01)
(Continued)

(52) U.S. Cl.
CPC .............. *G06V 20/59* (2022.01); *G06F 18/22* (2023.01); *G06V 10/141* (2022.01);
(Continued)

(58) Field of Classification Search
CPC .... G06V 20/597; G06V 10/141; G06V 10/25; G06V 10/143; G06V 10/147;
(Continued)

(56) References Cited

U.S. PATENT DOCUMENTS 8,735,792 B2 * 5/2014 Hammes .............. G06V 10/141
250/221
9,245,333 B1 1/2016 Beck
(Continued)

FOREIGN PATENT DOCUMENTS

WO 2008/020458 2/2008
WO 2015031942 A1 3/2015
(Continued)

OTHER PUBLICATIONS

Thakur, "Infrared Sensors for Autonomous Vehicles", IntechOpen, Dec. 2017, https://www.intechopen.com/books/recent-development-in-optoelectronic-devices/infrared-sensors-for-autonomous-vehicles.

(Continued)

*Primary Examiner* — Molly Wilburn
*Assistant Examiner* — Ahmed A Nasher
(74) *Attorney, Agent, or Firm* — FisherBroyles, LLP; Jason P. Mueller

(57) ABSTRACT

A disclosed monitoring system includes infrared light sources that illuminate a subject in a sequenced manner and a camera that captures images of the subject during periods in which the subject is illuminated by one of the light sources. The system includes a processor that analyzes captured images to determine a brightness measure of the images, and a controller controls output power of the infrared light sources in response to the brightness measure. In response to the processor detecting a brightness measure below a predetermined brightness threshold, the controller is (Continued)

configured to switch off or reduce an output illumination intensity of one of the infrared light sources. A disclosed method further determines whether an emission source is occluded by modulating an intensity of an electromagnetic emission source, detecting whether the modulation pattern is present in captured images, and determining that the emission source is occluded based on the detected modulation.

16 Claims, 9 Drawing Sheets

(51) Int. Cl.
    *G06V 10/141*     (2022.01)
    *G06V 10/143*     (2022.01)
    *G06V 10/147*     (2022.01)
    *G06V 10/60*     (2022.01)
    *G06V 20/59*     (2022.01)

(52) U.S. Cl.
    CPC .......... *G06V 10/143* (2022.01); *G06V 10/147* (2022.01); *G06V 10/60* (2022.01); *G06V 20/597* (2022.01)

(58) Field of Classification Search
    CPC .. G06V 10/60; G06V 20/59; G06V 2201/121; G06V 40/16; G06V 40/20; G06V 40/28; G06K 9/6215; G06T 7/11; G06T 2207/10048; G06T 2207/10152; G06T 2207/30201; G06T 2207/30041; G06T 2207/30268; G06F 3/013; H04N 23/74; A61B 5/18; A61B 2503/22; A61B 5/6893
    See application file for complete search history.

(56) References Cited

U.S. PATENT DOCUMENTS

| | | | |
|---|---|---|---|
| 9,436,870 B1* | 9/2016 | Mangiat | G06V 40/161 |
| 2005/0100191 A1 | 5/2005 | Harbach | |
| 2009/0261979 A1 | 10/2009 | Breed et al. | |
| 2012/0188355 A1 | 7/2012 | Omi | |
| 2013/0250046 A1 | 9/2013 | Schofield et al. | |
| 2015/0181100 A1* | 6/2015 | Publicover | H04N 23/11 |
| | | | 348/78 |
| 2016/0195927 A1 | 7/2016 | Lopez | |

FOREIGN PATENT DOCUMENTS

| | | |
|---|---|---|
| WO | 2016/191827 | 12/2016 |
| WO | 2016191827 A1 | 12/2016 |
| WO | 2019200434 A9 | 10/2019 |

OTHER PUBLICATIONS

Tan et al., "Pre-emptive shadows: Eliminating the blinding light from projectors", School of Computer Science, Carnegie Mellon University, Apr. 2012, https://www.microsft.com/en-us/research/wp-content/uploads/2016/12/Eliminating-the-Blinding-Light-from-Projectors.pdf.

* cited by examiner

INFRARED LIGHT SOURCE PROTECTIVE SYSTEM

This application is a national stage entry under 35 U.S.C. 371 of PCT Patent Application No. PCT/AU2019/050347, filed Apr. 18, 2019, which claims priority to Australia Patent Application No. 2018901300, filed Apr. 19, 2018 the entire contents of each of which is incorporated herein by reference.

FIELD OF THE DISCLOSURE

The present application relates to a control system configured to control one or more infrared light sources.

Disclosed embodiments provide control of power of infrared light source in a driver monitoring system. However, it will be appreciated that the disclosure is applicable in broader contexts and other applications.

BACKGROUND

Humans are constantly exposed to various levels of radiation across the electromagnetic spectrum, illustrated in FIG. 1.

Higher frequency radiation has more energy and can interact more strongly with matter that it encounters and is therefore generally more dangerous. For example, people can be constantly exposed to low frequency radio waves with no ill effects but even a relatively brief exposure to high frequency X-rays can be hazardous. The range of frequencies that are typically deemed to be dangerous to humans typically extends from ultra violet radiation to gamma rays. However, in some instances, lower frequency radiation such as infrared radiation can also be dangerous to humans.

Infrared emitting and sensing technology is used in many areas of technology today. Example applications include:
  Treatment of sports injuries and burns using infrared light emitting diodes (LEDs
  Remote controls for TVs and other electrical appliances.
  Short-range communications, for example between mobile phones, or for wireless headset systems.
  Camera illuminators to focus on subjects of interest.
  Satellite imaging of clouds for weather forecasts.
  Security and sensor systems.
  Night vision devices.
  Facial detection and recognition systems.

In many driver monitoring systems for vehicles, one or more infrared LEDs are used to emit infrared radiation into the scene including the driver's face. The reflected light is imaged by an infrared camera sensor as images, which are processed to sense driver drowsiness and/or attention levels. The non-visual nature of the infrared radiation does not distract the driver during operation of the vehicle. In such driver monitoring systems, the infrared LEDs are typically located about 30 centimeters to 1 meter from the driver's face.

Generally, unlike more powerful forms of electromagnetic energy, infrared radiation typically only has enough energy to start molecules moving and not to break them apart or cause tissue damage. When a person's tissue absorbs infrared light, the consequence is usually that a person feels warmth in the area exposed. Since infrared radiation works to get molecules moving, a moderate dose of infrared radiation will simply heat up any living tissue it is close to, that it radiates to or touches.

In some cases though, infrared radiation can be hazardous in that a prolonged exposure to a high level of infrared radiation could result in a burn, similar to exposure to a hot stove, another heat source or a long exposure period to the sun. The danger to people from too much infrared radiation is caused by overheating of tissues which can lead to skin burns. Skin exposed to infrared radiation generally provides a warning mechanism against the thermal effects. People may feel pain, but depending on the level of infrared exposure, the pain may not be immediately forthcoming with the exposure. For these reasons, standards such as IEC-62471 have been developed which regulate the operation of infrared emitting devices.

Protection against UV (and other harmful electromagnetic) rays may be achieved by administrative control measures such as limiting exposure times for employees in hazardous environments. Additionally personal protective equipment such as protective clothing may be used. However, in applications such as driver monitoring, where continuous or near-continuous illumination of a driver by infrared radiation is advantageous, these measures might be impractical and the inventor has identified that other solutions need to be found.

This is the case where the infrared emission source may be occluded by a portion of the human anatomy (e.g. a face or hand, which is placed closely adjacent the emission source.

SUMMARY

Disclosed embodiments aim to offset the drawbacks of using an infrared light source in various applications such as driver or occupant monitoring systems utilizing face or eye detection/recognition/tracking systems. LEDs or other infrared light sources are switched off or the power reduced when a human or other object is occluding the light source.

In a driver or occupant monitoring system, the system including at least one electromagnetic emission source and an imaging camera, a method of detection of occlusion of the emission source, comprising the stages of:
  (a) Modulating the electromagnetic emission source intensity in a predetermined manner;
  (b) Detecting if the modulation is present in at least a region of the corresponding image of the imaging camera;
  (c) On the basis of the degree of modulation present, determining if the emission source is occluded.

In some embodiments, the modulating stage (a) includes either a temporal or spatial modulation. In some embodiments, the image is divided into a number of tiled regions, and the detection stage is applied to each tiled region.

In some embodiments the modulating can include at least one of pseudo random modulation, sine or square wave modulation. In some embodiments the detecting stage can include applying a matching filter for the modulation to the captured imagery to determine if the modulation is present.

A disclosed monitoring system includes:
  one or more infrared light sources for illuminating a subject in a sequenced manner;
  a camera for capturing images of the subject during periods in which the subject is illuminated by one of the light sources;
  a processor for processing the captured images to determine a brightness measure of the images;
  a controller for controlling the output power of the infrared light sources in response to the brightness measure; and
  wherein, in response to the processor detecting a loss of performance below a predetermined brightness threshold, the controller is configured to switch off or reduce an output illumination intensity of one of the infrared light sources.

In some embodiments, the brightness measure is an average pixel intensity of the images. In some embodiments, the brightness measure is an average pixel intensity of a subset of the pixels of the images. In one embodiment, the brightness measure is an average pixel intensity of a pixel region within the image. The pixel region may correspond to a face, an eye or both eyes of the subject.

In some embodiments, the brightness measure is a comparison of brightness between two or more images. In one embodiment, the brightness measure is a comparison of brightness between sequential images. In other embodiments, the brightness measure is a comparison of brightness between two images captured during illumination by a common infrared light source. In some embodiments, the comparison includes comparing pixel intensities of two or more images on a pixel-by-pixel basis. In other embodiments, the comparison includes comparing an average pixel intensity of the two or more images.

In some embodiments, when an infrared light source has been switched off for a predetermined delay period, the controller is configured to reactivate the infrared light source for a test period during which one or more test images are captured, the controller being further configured to maintain the infrared light source in an active state if the brightness measure of the test images is equal to or greater than the predetermined brightness threshold, otherwise the controller deactivates the infrared light source.

In some embodiments, at least one of the light sources is disposed at an angle of greater than 3.2 degrees from the camera, as viewed along an optical axis from the subject. According to an embodiment, each of the light sources is disposed at an angle of greater than 3.2 degrees from the camera, as viewed along an optical axis from the subject.

In some embodiments, the output illumination intensity is determined by a lookup table stored in a database.

In some embodiments, in response to detecting a brightness measure below a predetermined brightness threshold, the controller reduces the output illumination intensity and increases or decreases the illumination period of the infrared light source based on a determination of radiation safety to the person.

In some embodiments, the processor is configured to detect a current level of the brightness measure from a plurality of predetermined plurality of levels and, in response, the controller is configured to set the output illumination intensity of one of the infrared light sources to a value corresponding to the current level.

In some embodiments, the system is fitted within a vehicle cabin and the subject is a driver or passenger of the vehicle.

A disclosed method of controlling a system of two or more infrared light sources includes:

i. illuminating a subject from one or more spaced apart infrared light sources in a sequenced manner;
ii. capturing images of a subject during periods in which the subject is illuminated by one of the infrared light sources;
iii. processing the captured images to determine a brightness measure of the images;
iv. comparing the brightness measure to a predetermined brightness threshold; and
v. controlling the output power of the infrared light sources in response to the comparison of stage iv, wherein, in response to detecting a brightness measure below the predetermined brightness threshold, an output illumination intensity of one of the infrared light sources is reduced or set to zero.

BRIEF DESCRIPTION OF THE FIGURES

Example embodiments of the disclosure will now be described, by way of example only, with reference to the accompanying drawings in which.

DETAILED DESCRIPTION

The protective system described herein may be applied and used in a multitude of environments. One example is monitoring a driver or passengers of an automobile or for example, other vehicles such as a bus, train or airplane. Additionally, the described system may be applied to an operator using or operating any other equipment, such as machinery and flight simulators. For ease of understanding, the disclosed embodiments are described herein within the context of a driver monitoring system for a vehicle. Furthermore, although the infrared light sources are described as being LEDs, it will be appreciated that the disclosed systems applicable to other types of infrared light sources such as vertical-cavity surface-emitting lasers (VCSELs).

System Overview

Figure 1:
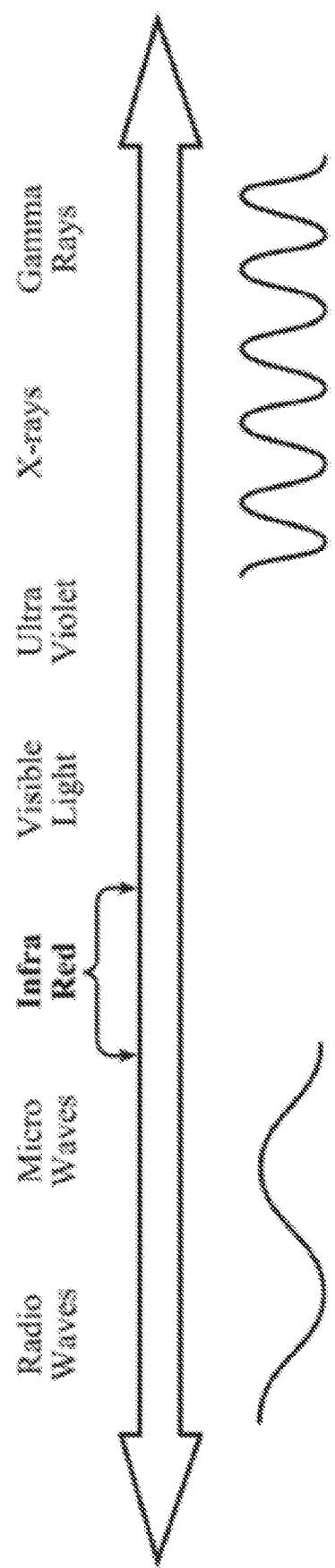
FIG. 1 illustrates the electromagnetic spectrum and its primary sub-bands.
Figure 2:
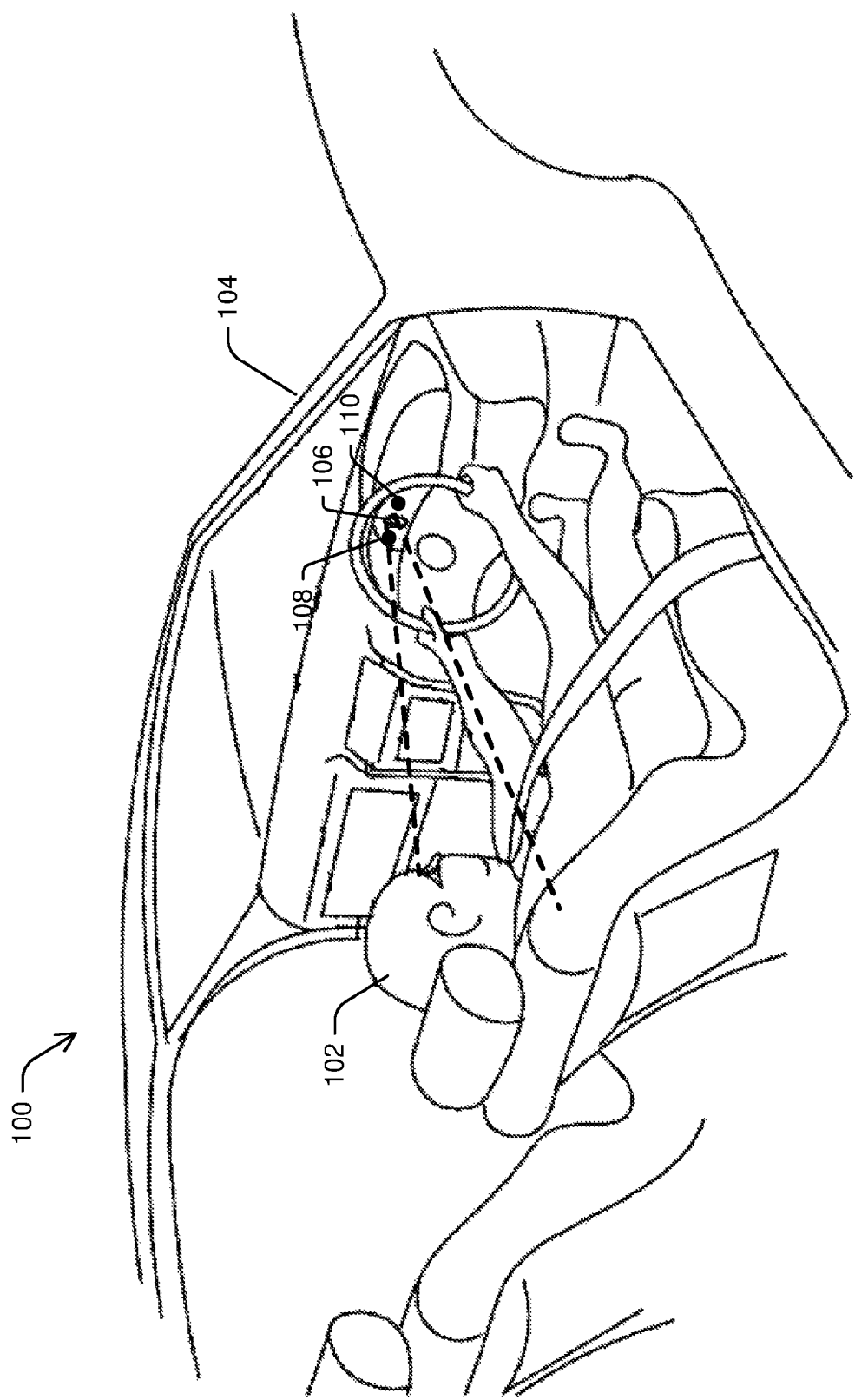
FIG. 2 is a perspective view of the interior of a vehicle having a driver monitoring system including a camera and two LED light sources installed therein.
Figure 3:
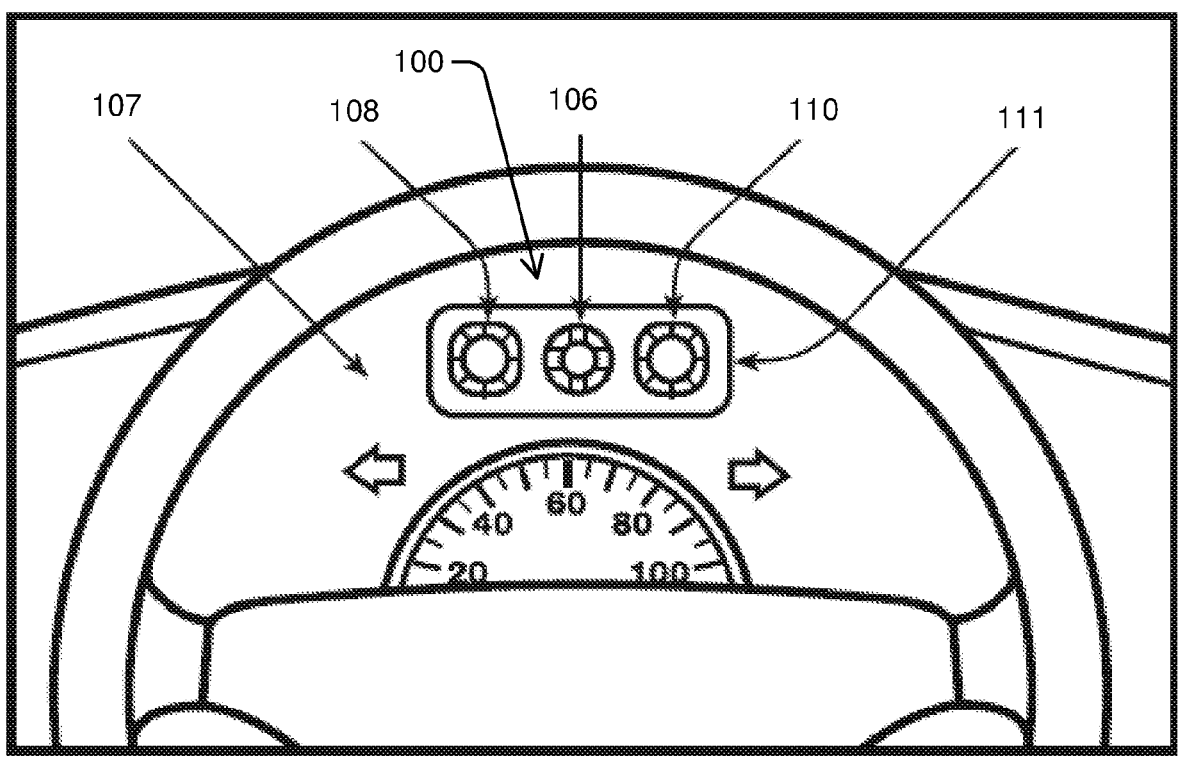
FIG. 3 is an illustration of a driver's perspective view of an automobile dashboard having the driver monitoring system of FIG. 2 installed therein.
Figure 4:
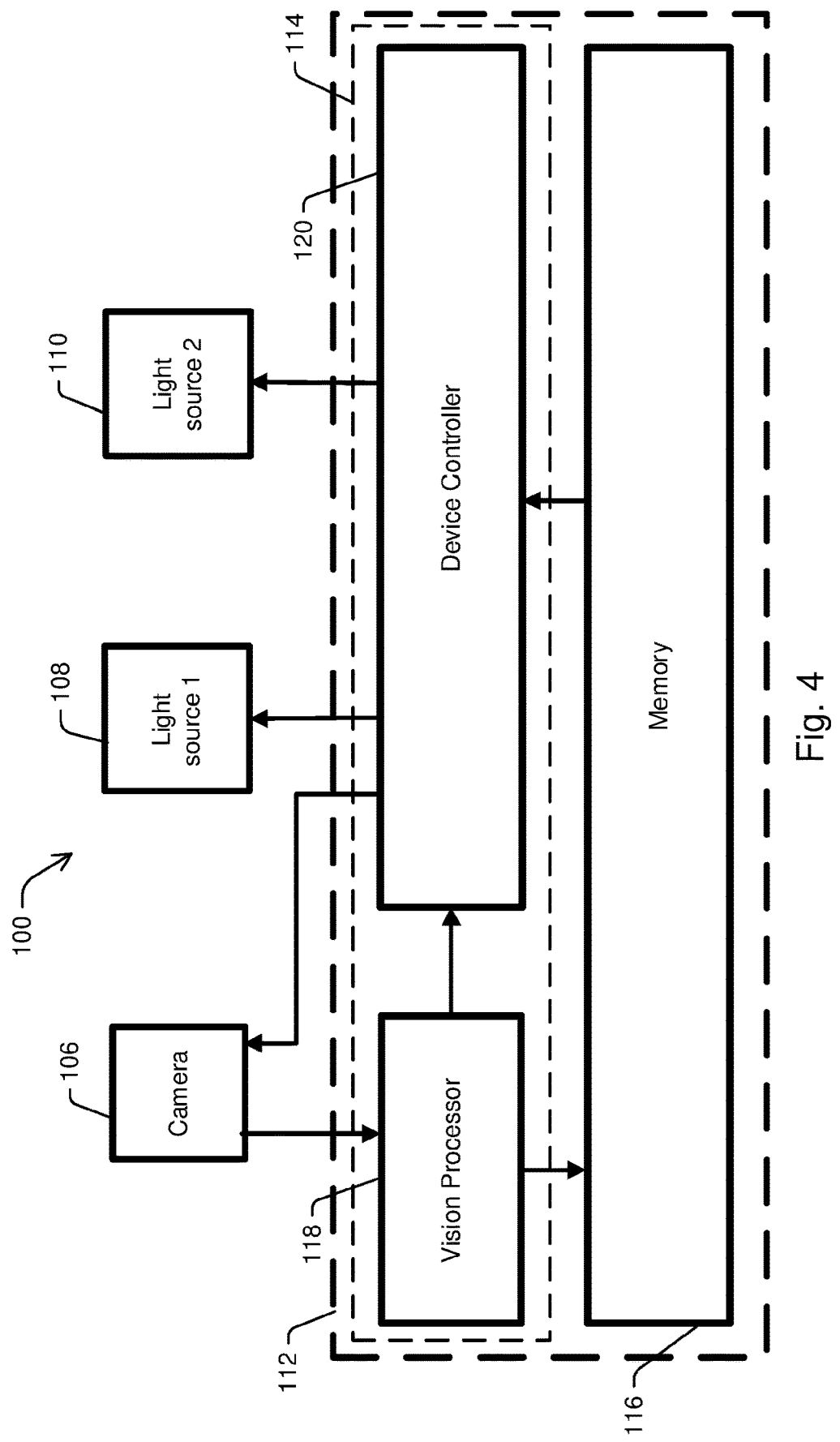
FIG. 4 is a schematic functional view of a driver monitoring system according to FIGS. 2 and 3.

Referring initially to FIGS. 2 to 4, there is illustrated a driver monitoring system 100 for capturing images of a vehicle driver 102 during operation of a vehicle 104. System 100 is further configured for performing various image processing algorithms on the captured images such as facial detection, facial feature detection, facial recognition, facial feature recognition, facial tracking or facial feature tracking, such as tracking a person's eyes. Example image processing routines are described in U.S. Pat. No. 7,043,056 to Edwards et at. entitled "Facial Image Processing System" and assigned to Seeing Machines Pty Ltd, the contents of which are incorporated herein by way of cross-reference.

As best illustrated in FIG. 3, system 100 includes an imaging camera 106 that is positioned on or in the vehicle dash 107 instrument display and oriented to capture images of the driver's face in the infrared wavelength range to identify, locate and track one or more human facial features.

Camera 106 may be a conventional CCD or CMOS based digital camera having a two dimensional array of photosensitive pixels and optionally the capability to determine range or depth (such as through one or more phase detect elements). The photosensitive pixels are capable of sensing electromagnetic radiation in the infrared range. Camera 106 may also be a three dimensional camera such as a time-of-flight camera or other scanning or range-based camera capable of imaging a scene in three dimensions. In other embodiments, camera 106 may be replaced by a pair of like cameras operating in a stereo configuration and calibrated to extract depth. Although camera 106 may be configured to image in the infrared wavelength range, it will be appreciated that, in alternative embodiments, camera 106 may image in the visible range.

Referring still to FIG. 3, system 100, in a first embodiment, also includes a pair of infrared light sources in the form of light emitting diodes (LEDs) 108 and 110, horizontally symmetrically disposed at respective positions proximate to the camera on vehicle dash 107. LEDs 108 and 110 are configured to illuminate driver 102 with infrared radiation, during a. time when camera 106 is capturing an image, so as to enhance the driver's face to obtain high quality images of the driver's face or facial features. Operation of camera 106 and LEDs 108 and 110 in the infrared range reduces visual distraction to the driver. LEDs 108, 110 may be operated continuously, intermittently or periodically and may be operated alternatively in a strobed fashion which provides operational advantages in reducing glare present in the images. Operation of camera 106 and LEDs 108, 110 is controlled by an associated controller 112 which includes a computer processor or microprocessor and memory for storing and buffering the captured images from camera 201. In other embodiments, different types of light sources may be used in place of LEDs.

As best illustrated in FIG. 3, camera 106 and LEDs 108 and 110 may be manufactured or built as a single system 111 having a common housing. The system 111 is shown installed in a vehicle dash 107 and may be fitted during manufacture of the vehicle or installed subsequently as an after-market product. In other embodiments, the driver monitoring system 100 may include one or more cameras and light sources mounted in any location suitable to capture images of the head or facial features of a driver, subject and/or passenger in a vehicle. By way of example, cameras and LEDs may be located on a steering column, rearview mirror, center console or driver's side A-pillar of the vehicle. Also, in some embodiments, more than two light sources may be employed in the system. In the illustrated embodiment, the first and a second light source each include a single LED. In other embodiments, each light source may each include a plurality of individual LEDs.

In the illustrated first embodiment, LEDs 108 and 110 may be spaced apart horizontally by a distance in the range of about 2 cm to 10 cm and located about 30 cm to 80 cm from the driver's face. The separation of LEDs 108 and 110 is variable provided that the LEDs are located sufficiently off-axis from the camera such that red-eye effects are not present in the captured images. Typically, red-eye effects can be avoided when the LEDs illuminate the driver at angles greater than about 3 degrees from the camera optical axis.

Some embodiments of the disclosure are configured to operate in "dark pupil" conditions. Such conditions require the light sources to be located greater than a specified angle from the camera, as viewed from the driver along an optical axis. The bright pupil effect is influenced by many factors including: the dilation (size) of the pupil, the gaze angle relative to the camera, and the wavelength of light. By way of example, an angle of 3.2 degrees may be used to demark bright and dark pupil conditions as a guideline for balanced package size/signal performance at 950 nm.

In dark pupil conditions, the red-eye effects are removed or substantially reduced and specular reflections on glasses do not overlap enough to degrade tracking. Driver monitoring systems operating in dark pupil conditions can provide enhanced performance in terms of higher eyelid and gaze availability and accuracy. In some embodiments, system 100 is configured to operate when only one or a subset of the LEDs are positioned in a dark pupil condition.

Turning now to FIG. 4, the functional components of system 100 are illustrated schematically. A system controller 112 acts as the central processor for system 100 and is configured to perform a number of functions as described below. Controller 112 is located within the dash 107 of vehicle 104 and may be connected to or integral with the vehicle on-board computer. In another embodiment, controller 112 may be located within a housing or enclosure together with camera 106 and LEDs 108 and 110. The housing or enclosure is able to be sold as an after-market product, mounted to a vehicle dash and subsequently calibrated for use in that vehicle. In further embodiments, such as flight simulators, controller 112 may be an external computer or computing system such as a personal computer.

Controller 112 may be implemented as any form of computer processing device or portion of a device that processes electronic data, e.g., from registers and/or memory to transform that electronic data into other electronic data that, e.g., may be stored in registers and/or memory. As illustrated in FIG. 4, controller 112 includes a microprocessor 114, executing code stored in memory 116, such as random access memory (RAM), read-only memory (ROM), electrically erasable programmable read-only memory (EEPROM), and other equivalent memory or storage systems.

Microprocessor 114 of controller 112 includes a vision processor 118 and a device controller 120. Vision processor 118 and device controller 120 represent functional elements which are both performed by microprocessor 114. However, it will be appreciated that, in alternative embodiments, vision processor 118 and device controller 120 may be realized as separate hardware such as microprocessors in conjunction with custom or specialized circuitry.

Vision processor 118 is configured to process the captured images to perform the driver monitoring; for example to determine a three dimensional head pose and/or eye gaze position of the driver 5 within the monitoring environment. To achieve this, vision processor 118 utilizes one or more eye gaze determination algorithms. This may include, by way of example, the methodology described in U.S. Pat. No. 7,043,056 to Edwards et al entitled "Facial Image Processing System" and assigned to Seeing Machines Pty Ltd. Vision processor 118 may also perform various other functions including determining attributes of the driver 5 such as eye closure, blink rate and tracking the driver's head motion to detect driver attention, sleepiness or other issues that may interfere with the driver safely operating the vehicle.

The raw image data, gaze position data and other data obtained by vision processor 118 is stored in memory 116.

Device controller 120 is configured to control camera 106 and to selectively actuate LEDs 108 and 110 in a sequenced manner in sync with the exposure time of camera 106. For example, LED 108 may be controlled to activate during odd image frames and LED 110 is controlled to active during even image frames to perform a strobing sequence. Other illumination sequences may be performed by device controller 120, such as L,L,R,R,L,L,R,R ... or L,R,0,L,R,0,L, R,0 ... where "L" represents left mounted LED 108, "R" represents right mounted LED 110 and "0" represents an image frame captured while both LEDs are deactivated. LEDs 108 and 110 are electrically connected to device controller 120 but may also be controlled wirelessly by controller 120 through wireless communication such as Bluetooth™ or WiFi™ communication.

Thus, during operation of vehicle 104, device controller 120 activates camera 106 to capture images of the face of driver 102 in a video sequence. LEDs 108 and 110 are activated and deactivated in synchronization with consecutive image frames captured by camera 106 to illuminate the driver during image capture. Working in conjunction, device controller 120 and vision processor 118 provide for capturing and processing images of the driver to obtain driver state information such as drowsiness, attention and gaze position during an ordinary operation of vehicle 104.

Additional components of the system may also be included within the common housing of system 111 or may be provided as separate components according to other additional embodiments. In one embodiment, the operation of controller 112 is performed by an onboard vehicle computer system which is connected to camera 106 and LEDs 108 and 112.

Infrared Radiation Protection

The embodiments relates to a light source control method to reduce the exposure of a subject to infrared radiation from infrared radiation sources. The method can be implemented by imaging systems such as driver monitoring system 100, in which a subject is illuminated by more than one infrared light source for imaging by a camera.

Figure 5:
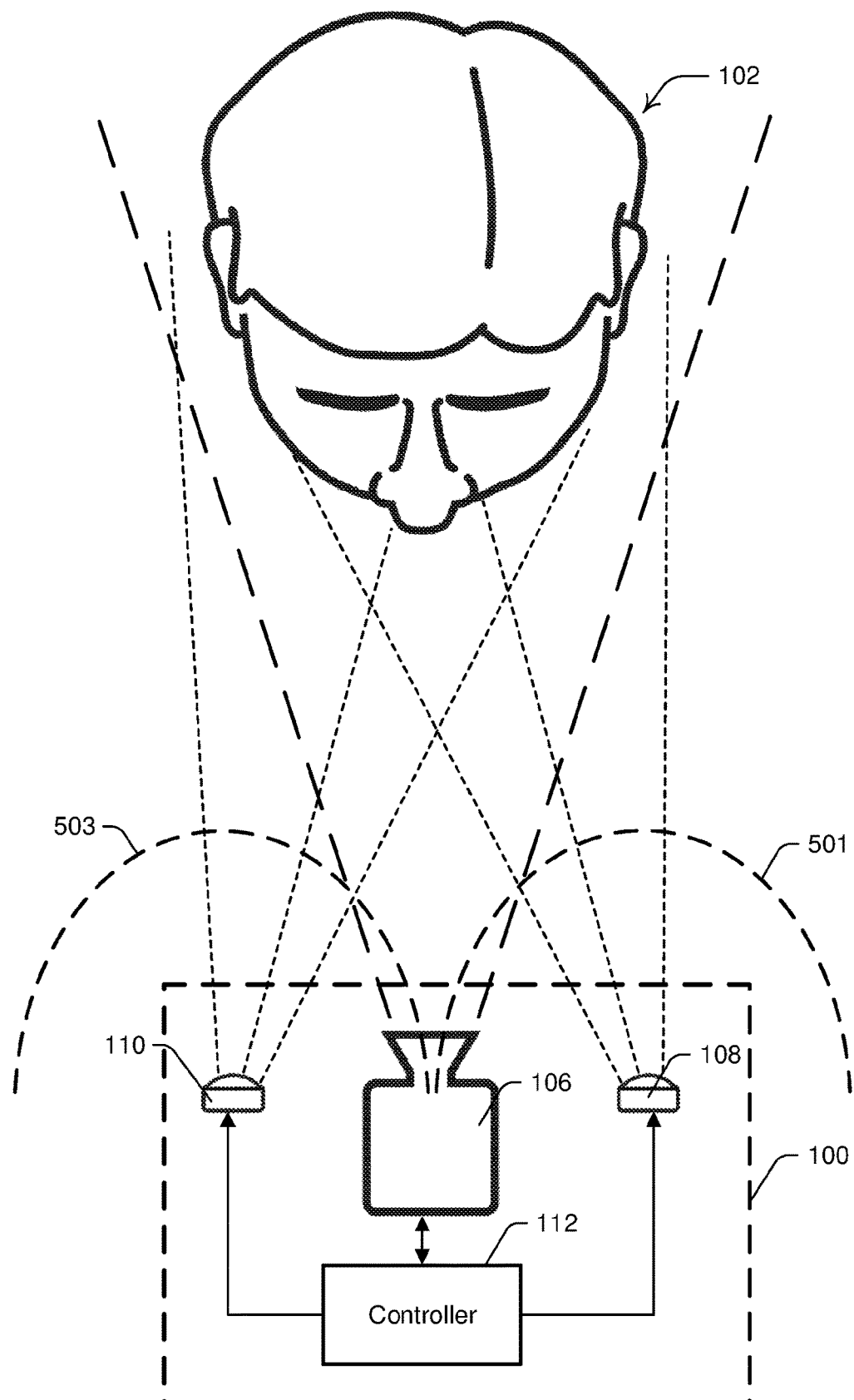
FIG. 5 is a schematic plan view of the driver monitoring system of FIGS. 2 to 4 interacting with a driver and illustrating the illumination and imaging fields of view of LEDs and a camera, together with respective caution zones for each LED.

Referring now to FIG. 5, there is illustrated a plan view of system 100 interacting with driver 102. In typical circumstances, using the dash-mounted system 100, the vehicle driver is generally sufficiently far from LEDs 108 and 110 (which are sources of such that there are no infrared hazards or dangers to the driver 230. However, if any part or portion of the driver 230 is positioned too close or within a short distance from the infrared LEDs 204, 206, there may be a safety concern. In this case, there may be enough power density or energy emitted by the infrared LEDs to warm or burn human tissue, which may be similar to a strong exposure to the sun on a clear day.

The distance from or the area around the infrared LEDs where there may be a safety concern will be referred to as a "caution zone" 501 and 503, as illustrated in FIG. 5. The size or distance of the caution zone varies depending upon several factors that include but are not limited to an average or peak power level for each infrared LED, the frequency emitted by the LED and whether there are surfaces or objects close to the infrared LED that reflect infrared energy. A caution zone or distance is typically less than 10 cm from the infrared LED. However, for a powerful infrared LED or powerful light source, the distance may be in the range of 15 cm or even greater.

Figure 6B:
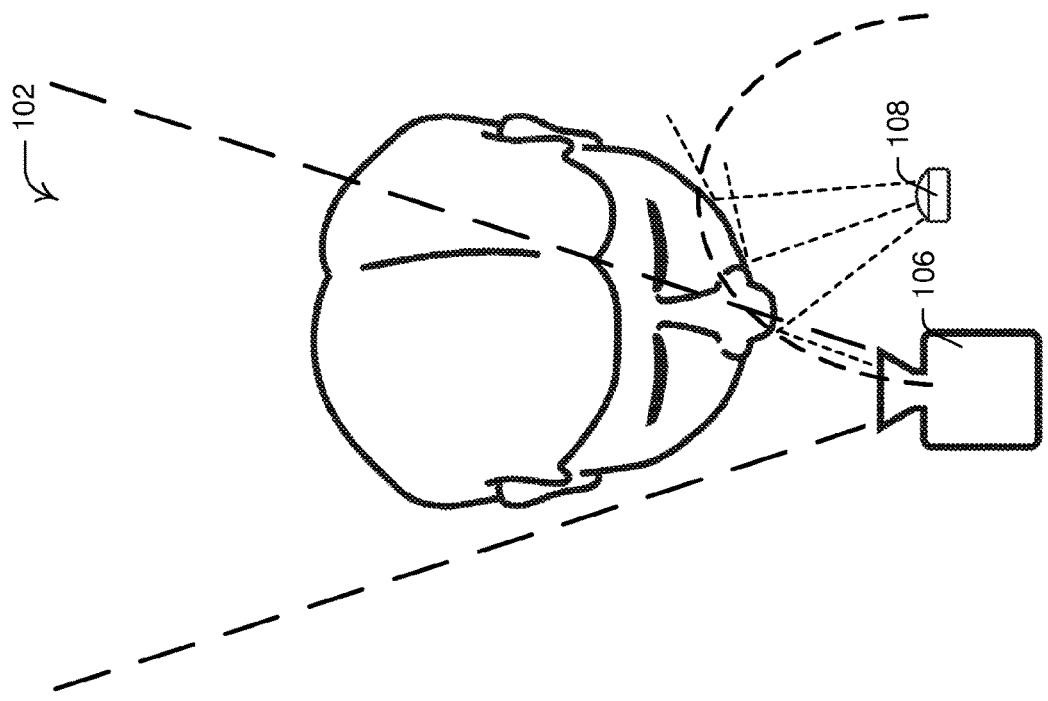
FIGS. 6A and 6B are schematic plan views of the driver monitoring system of FIGS. 2 to 4 interacting with a driver at different distances.
Figure 6A:
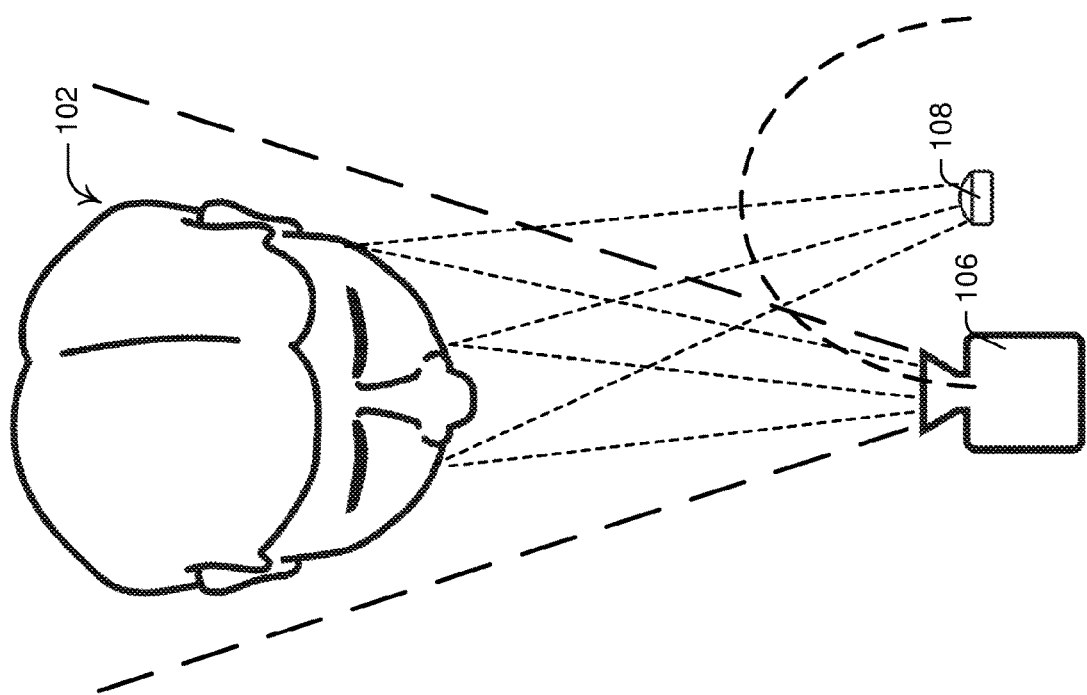

In a first embodiment, the detection of an object within the caution zone is estimated based on a brightness assessment of captured images. As illustrated in FIG. 6, as the driver moves closer to an LED and off axis, more light is scattered away from the field of view of camera 106. This results in shadowing of the driver which gives rise to a reduced overall brightness of the captured image. An absolute brightness level or the change in brightness of the image can be assessed relative to a predetermined brightness threshold and the output power of the LED controlled accordingly.

Figure 7:
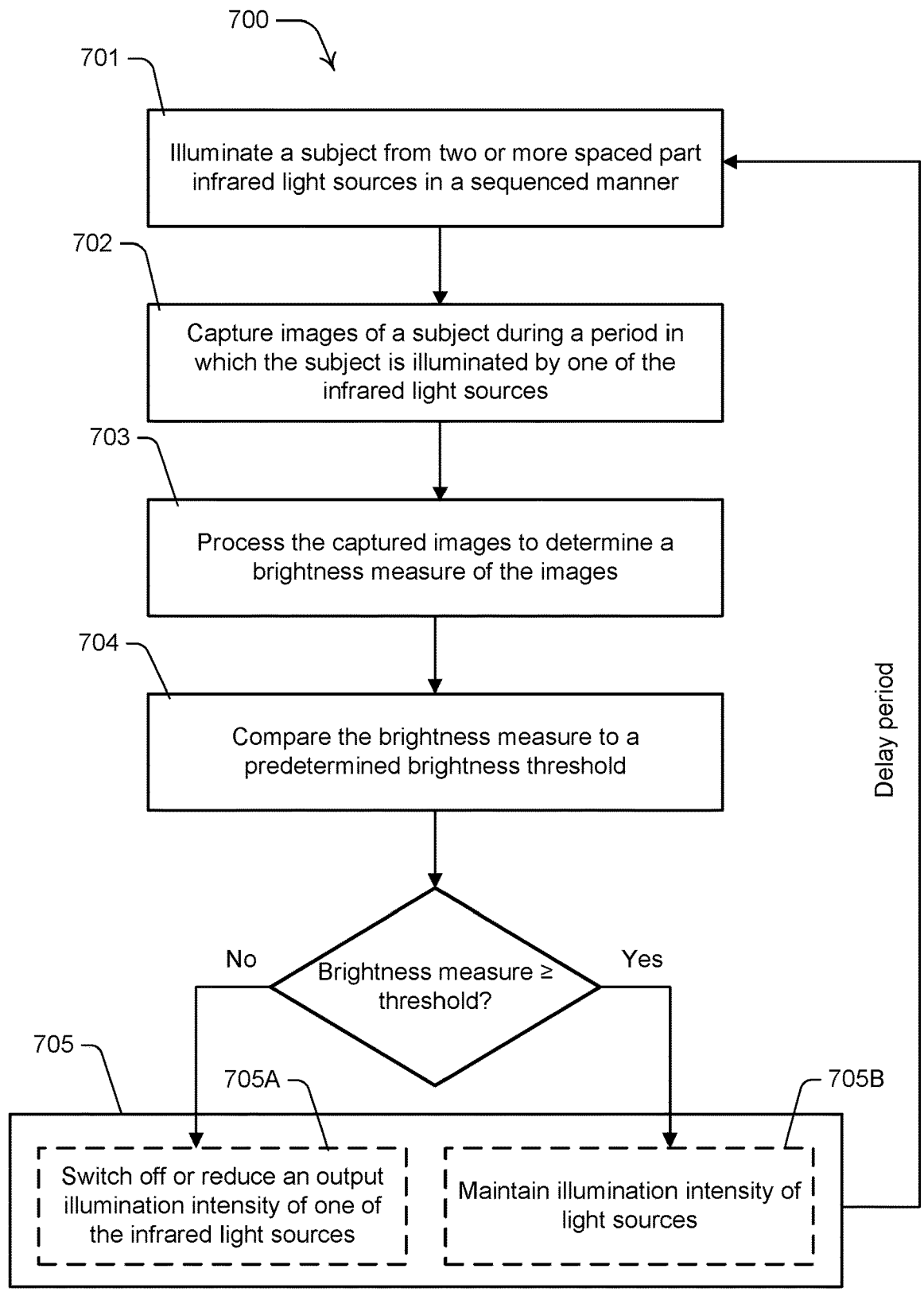
FIG. 7 is process flow diagram illustrating the primary stages in a method of controlling a system of two or more infrared light sources.

Referring now to FIG. 7, there is illustrated a method 700 of controlling a system of two or more infrared light sources, such as system 100. Method 700 will be described with reference to the operation of system 100 for simplicity. However, it will be appreciated that method 700 is applicable to other imaging systems in which a subject is illuminated with infrared radiation from two or more infrared light sources and imaged with an infrared sensitive camera.

Method 700 includes the initial stage 701 of illuminating a subject (e.g. driver 102) from two or more spaced apart infrared light sources (e.g. LEDs 108 and 110) in a sequenced manner. As mentioned above, the LEDs may be programmed to illuminate in a number of different sequences. However, in method 700, at least a subset of the captured images must be captured while the subject is illuminated by a single LED.

At stage 702 images of the subject are captured using camera 106. In the case of driver monitoring system 100, the images relate to driver's face including the driver's eyes to monitor eye gaze and drowsiness. In some embodiments, the captured images are stored in memory 16 after optionally being subject to pre-processing by vision processor 118 or by on-board hardware of the camera 106 itself.

At stage 703, the captured images are processed by vision processor 118 to determine a brightness measure of the image. The brightness measure may be one or more of a number of calculations relating to brightness, as described below.

In some embodiment, the brightness measure is a measure of average pixel intensity of each image. For a grayscale image, the pixel intensity of a typical camera sensor will be an 8-bit digital integer within a range of 0 to 255, with 0 representing black and 255 representing white. Thus, in these systems, the average brightness value will have a value within this range determined by the sum of each pixel intensity divided by the number of pixels. It will be appreciated, however, that other camera sensors may record pixel intensities in higher or lower bit sizes and therefore greater or smaller intensity ranges.

If the camera sensor stores images as color images, separate red, green and blue components are specified for each pixel. In color imaging systems, a pixel intensity may be calculated as a vector of three numbers (red, green and blue). In some embodiments, the three different color components are stored as three separate grayscale images and the pixel intensity calculated from the grayscale versions of the color image.

The measure of average pixel intensity may be performed on all pixels in an image to calculate the overall average pixel intensity or it may be performed only on a subset of the pixels of each image. The latter operation may be useful where the image includes less useful components such as a dark background behind a driver's face. For example, the subset of pixels to select for determining an average pixel intensity may fall within a specific pixel region within the image. The pixel region may correspond to a detected feature within the image, such as a face, an eye or both eyes of the driver/subject. To determine the pixel region, the feature must first be identified. Traditional feature recognition techniques such as pattern matching, and edge and contrast detection may be performed. Machine learning algorithms may also be employed to recognize the features. Once the feature has been identified, a bounding region around the feature may be designated to define the relevant pixel region from which the average pixel intensity is to be calculated.

In other embodiments, the brightness measure may include a comparison of brightness between two or more images. The comparison may be between sequential images in an image stream or between predetermined sequences of images in the image sequence. In the case where images are captured under an alternating illumination sequence left and right LEDs (L,R,L,R,L,R . . . ), sequential images will be illuminated by alternating LEDs. Thus, a comparison in brightness level between sequential images will indicate which LED is being occluded and producing a lower brightness image. Using the same illumination sequence, a comparison of brightness between sequential odd or even images will be representative of two images captured during illumination by a common infrared LED. A comparison in this regard may also indicate an occlusion of that LED in the case where the brightness reduces significantly between successive images illuminated by that common LED.

In some embodiments, the brightness comparison includes comparing more than two images. By way of example, the comparison may compare the brightness of an image illuminated by one LED with the past two or more images illuminated by that same LED. Alternatively, the comparison may compare the brightness of an image illuminated by one LED with the past two or more images illuminated by another LED. In addition, the comparison may compare the brightness of a past number of images regardless of the illuminating LED.

In embodiments where the brightness measure involves a comparison of brightness between two or more images, the comparison may be made by comparing the pixel intensities of corresponding image pixels on a pixel-by-pixel basis or comparing an average pixel intensity (either the entire image or a subset of the pixels) of the different images.

At stage 704, vision processor 118 performs a comparison of the brightness measure to a predetermined brightness threshold stored in memory 116. The brightness threshold may represent an average pixel intensity that must be achieved for a given image or may represent a brightness difference between multiple images (where the brightness measure is based on a brightness comparison between multiple images). The brightness threshold may be dependent on the geometry of the imaging system, such as the distance between the LEDs, subject and camera, and the specifications of the LEDs (e.g. maximum output illumination intensity and pulse duration). By way of example, the brightness threshold may be equal to a specific average pixel intensity (between 0 and 255) such as 128, 100, 64. Alternatively, the brightness threshold may be equal to a percentage of an average pixel intensity calculated over a number of past images, such as 75%, 50%, 40%, 30%, 25%, 20% or 10% of the past average pixel intensity.

At stage 705, the output power of the infrared LEDs is controlled in response to the comparison performed in stage 704. In response to detecting a brightness measure below the predetermined brightness threshold, at stage 705A device controller 120 either switches off or reduces an output illumination intensity of one of the infrared LEDs. For example, the LED deemed responsible for the reduction in image brightness is switched off or reduced in output illumination intensity. This is determined on the basis that the reduced brightness is due to the subject being too close to the LED, as illustrated in FIG. 6B, and causing shadowing of the image. Alternatively, it could be due to occlusion of the subject in the image by an object.

If, at stage 705, the brightness measure is equal to or greater than the predetermined brightness threshold, at stage 705B, device controller 120 maintains the output illumination intensity of the LEDs.

The system operation described above is essentially binary in which LED control is either in a high power state or a lower power state (or switched off entirely) based on the measured brightness of captured images. In other embodiments, a more dynamic control of the LEDs is provided wherein the output power of the LEDs is controlled to within a plurality of power levels by device controller 120 in response to the measured brightness. In this regard, in some embodiments, stage 704 involves a comparison of the brightness measure with more than one threshold level. In these embodiments, a plurality of levels, corresponding to different brightness threshold levels, are defined and vision processor 18 is configured to determine which of these levels (a "current level") matches the brightness measure. In response, the device controller 120 is configured to send a control signal to the LED to drive the LED at one of a plurality of output illumination intensity levels corresponding to the current level. By way of example, the brightness measure may be compared to four brightness threshold levels having corresponding output illumination intensity levels at which the LEDs are driven. For example:

| Threshold brightness level (avg. pixel intensity) | Normalized output illumination intensity |
| --- | --- |
| 0-63 | 0 |
| 64-127 | 0.25 |
| 128-191 | 0.5 |
| 192-255 | 1 |

It will be appreciated that fewer or greater threshold levels and corresponding output illumination intensity values can be defined. The number of threshold brightness level range bins used and the appropriate LED output illumination intensity for each range bin are determined by controller 112 and may be programmed by a user of the system. In some embodiments, the output illumination intensity as above may be determined by a lookup table stored in memory 116.

Figure 8:
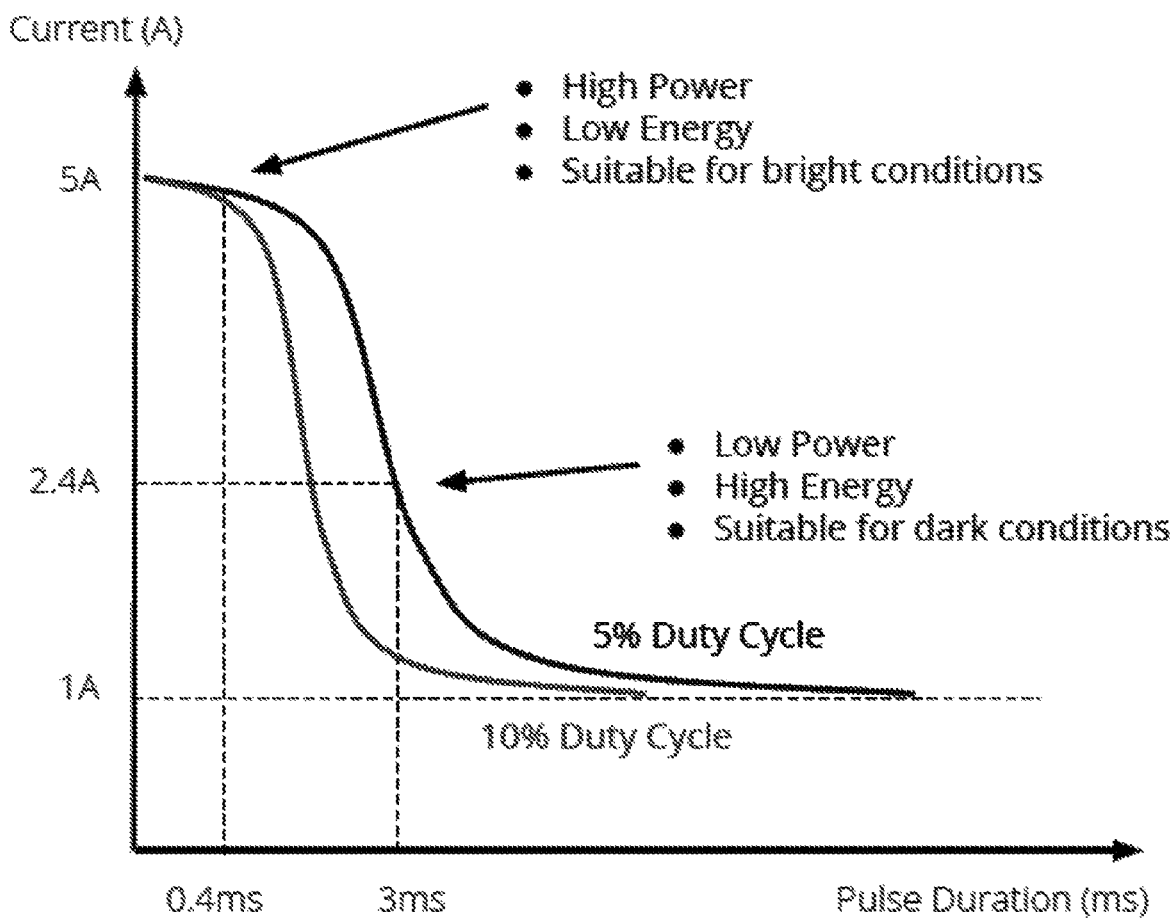
FIG. 8 is a graph illustrating exemplary LED pulse handling curves for 5% and 10% duty cycles.

As the illumination intensity is increased or reduced, the pulse time duration or illumination period of the LED can be reduced or increased relatively so as to maintain the LED within specified safe and stable operating limits. This determination of output illumination intensity and pulse duration is typically based on a predefined pulse handing curve, such as the one illustrated in FIG. 8. Such curves are typically based on a determination of radiation safety to humans and/or stable operating conditions to avoid damage from excessive heat. An example standard established for safe LED operation is IEC62471.

A system of multiple threshold levels allows the imaging system to control the light source illumination intensities based on a brightness measure of the captured images. On the basis that a closer object in the path of the LED will give rise to darker shading, this is a quasi-measure of distance between the subject and the LED.

During a period in which one of the LEDs is deactivated, device controller 120 may be configured to capture images at a lower frame rate so that images are only captured during illumination by the remaining activated LED or LEDs. Alternatively, vision processor 120 may be configured to ignore the images captured during periods when the deactivated LED was previously controlled to illuminate the images.

System 100 is also configured to test when the subject has retreated from the LED to a safe distance so as to reactivate the LED. In this regard, when an LED has been switched off for a predetermined delay period, device controller 120 is configured to reactivate the LED for a test period during which one or more test images are captured by camera 106. The test period is may be a fixed time period such as 0.2, 0.5 or 1 second, or it may be a predetermined number of image frames such as 10, 20, 25 or 30 frames. Controller 112 is configured to perform method 700 during the test period to determine if the brightness of the images captured by the previously deactivated LED have since increased (indicating the subject is no longer occluding the LED). Device controller 120 is further configured to maintain the LED in an active state if the brightness measure of the test images is equal to or greater than the predetermined brightness threshold, otherwise the controller deactivates the infrared light source.

Although labelled as "test images", the images obtained during the test period may be used for the driver monitoring procedure if the relevant features of the driver can be suitably distinguished.

The system described above allows for the proximity between a subject and an LED to be monitored (via the proxy measure of image brightness) and feedback control is fed to device controller 120 to limit or deactivate the output power of the LED based on the detection of the LED being an unsafe distance from the driver. The disclosed embodiments may be used in conjunction with other LED power control systems/techniques such as that described in PCT Patent Application Publication WO 2015/031942 to Edwards, entitled "Low Power Eye Tracking System and Method", and PCT Patent Application Publication WO 2016/191827 to Edwards, entitled "Protective System for Infrared Light Source", both of which are assigned to Seeing Machines Limited.

In operation, method 700 is performed continuously or at predefined intervals so that the driver can be monitored continuously while remaining safe from excess infrared radiation exposure.

In addition to providing safety advantages, the disclosed embodiments also have applications in creating a lighting diagnostic function for a driver monitoring system. In these applications, the disclosed system is configured to detect if an infrared light is "blocked" by an obstacle at close range, which can be useful:

(1) to help the driver monitoring system change the strobing illumination pattern to only use unlocked lights for tracking purposes, which improves the tracking performance in these conditions; and (2) if the occlusion condition persists for a significant period (e.g. 10 minutes), to then assume that the IR light itself is damaged or defective in some way that prevents light being output.

Further Embodiments

A number of other methods can be used for occlusion detection, including methods which extend to single infrared source occlusion detection.

Figure 9:
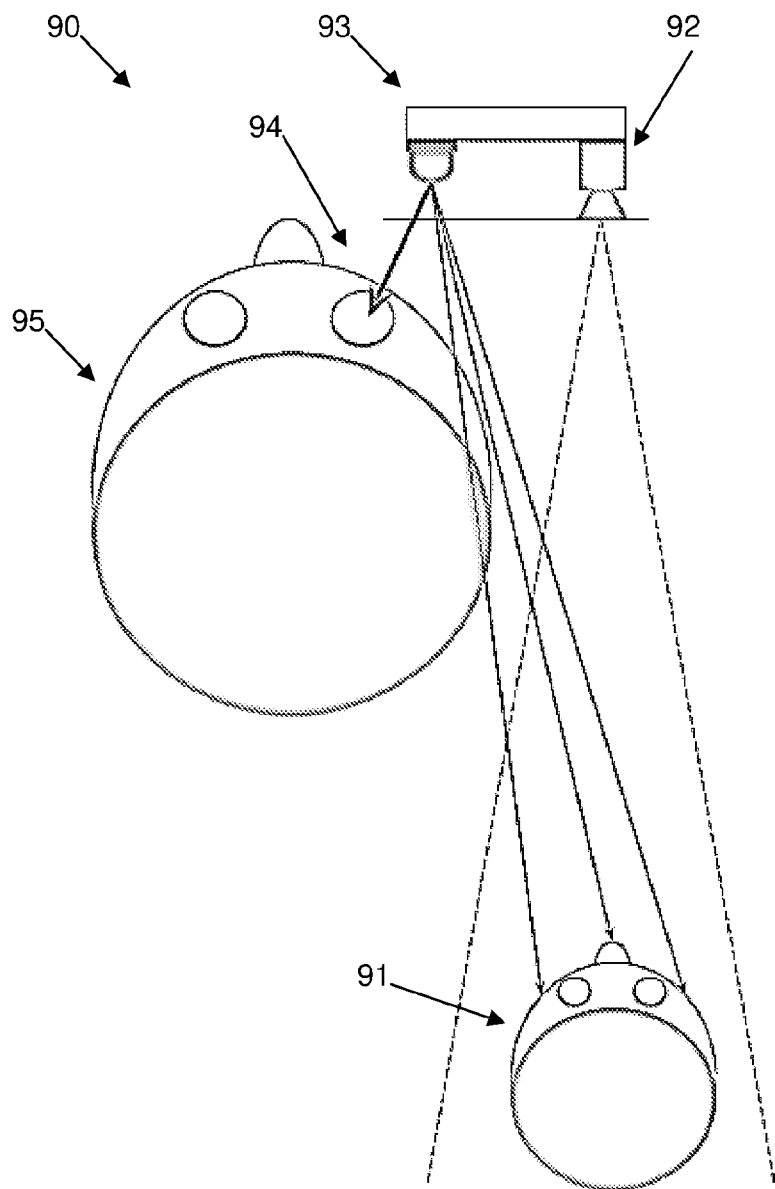
FIG. 9 illustrates an example single LED occlusion case.

A simple example of the desired set up is illustrated schematically 90 in FIG. 9, where a user 91 is being imaged by an imaging camera 92, which relies on a single infra-red imaging emitter 93. A second person 95 is dangerously close to the emitter 93, such that their eye 94 is too close to the source. The second embodiment is configured to detect such partial occlusion instances, where the emitter is partially occluded.

In the further alternative embodiment, one or more cameras and one or more IR light-emission sources could be provided.

The further embodiment uses an "IR blockage detection algorithm" and a high-level state machine that implements the eye-safety mechanism. The system utilizes the concept of a "low energy" IR light-source mode. In this mode, the IR light-source is controlled so that the human eye can be indefinitely exposed without suffering any biological damage, following IEC-62471. A number of techniques can be used. For example, time-domain modulation of IR light-source transmit intensity is used to disambiguate components of IR light-source from sun (or any other sources), through matched filtering of the modulation pattern at the receiver (image sensor).

In a further refinement, the IR blockage detection algorithm can operate over a set of image regions, with matched filtering of intensity over time being applied over each image region. The algorithm then assumes that the IR light-source is blocked by an eye, if any of the image regions do not show detection of the modulation pattern. In some arrangements, the IR. light-source can be put into low-power mode when considered blocked.

The arrangement provides the ability to protect eye safety when using only single IR light-source and without use of a secondary proximity sensor.

In general, we can control intensity and activation of each IR light. Hence, in the most common design, only a single IR light to be used (mono dark pupil or bright pupil).

In general, the captured image will include light from the IR light emission sources combined with other uncontrolled sources, such as the sun, ambient light. To determine if there is any obstacle being in close proximity to the IR light, the occlusion detection algorithm must detect if the IR light component exists in the image. To deal with a partial blockage, the image can be broken into regions and an IR light component is detected in each region.

Where the IR component is not detected in a predetermined number of regions, a potential occlusion flag can be raised.

In order to detection occlusion, it is possible to rely on Specular Reflection Availability vs Time. If availability is greater than an experimentally determined threshold, decide that IR light is not blocked. If availability is <threshold, decide that IR light is blocked (and therefore enter a safety mode). The decision can be made over a time period that can account for no reflections being detected due to occlusion, pose, etc., that is also within the hazard exposure time period of say 8 seconds.

In one embodiment, an encoded Intensity Pattern can be provided. For example, a 10% intensity variation pseudo-random illumination variation pattern applied to every frame. The known IR light output intensity is passed into a recurrent neural network (RNN) alongside intensity values derived from a grid of image regions. The RNN effectively correlates image intensity changes to IR light intensity changes. The RNN is trained against truth of pod blockage, which is easy to obtain.

In a further alternative, other encoded activation patterns could be used. This is similar to encoded intensity, but switching the IR light off very occasionally. Look at intensity vs time.

A further alternative is to use a structured light pattern. The light sources can be controlled to emit a low-contrast pattern that can be detected in resulting images. If the pattern is not visible, the IR light can be determined to be occluded, regardless whether there is sufficient ambient light to produce a well exposed image.

To separate IR light component (signal) from other light components (noise), the IR light intensity can be intentionally modulated with a predetermined pattern. The modulation can be in the time-domain, spatial domain, or both. The predetermined pattern can be detected in each image region using a matched filter over pixel intensity information.

Different modulation practices can be used. For example, switching off the source for 1 frame in every second, applying a sinusoidal or square wave variation to the light intensity, applying a predetermined pseudo random modulation to the light intensity.

Whilst the detection can rely on a matched filter, other techniques, such as a recurrent neural network can be used.

Upon detection of an occlusion, the system can be transitioned to a low power state to reduce the risks of damage to the close observer.

Interpretation

The term "infrared" is used throughout the description and specification. Within the scope of this specification, infrared refers to the general infrared area of the electromagnetic spectrum which includes near infrared, infrared and far infrared frequencies or light waves.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a given feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the various features, structures or characteristics may be combined in any suitable manner, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the features or elements or stages listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means the same thing as comprising.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various embodiments. This method of disclosure, however, is not to be interpreted as reflecting an intention that the claims require more features than are expressly recited in each claim. The claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments. For example, in the following claims, any of the claimed embodiments can be used in any combination.

In the description provided herein, numerous specific details are set forth. However, it is understood that embodiments of the disclosure may be practiced without these specific details. In other instances, conventional methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or systems. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the disclosure. Although the disclosure been described and explained in terms of exemplary embodiments, additional embodiments can be readily envisioned that are within the scope of the disclosure.

What is claimed is:

1. A monitoring system for protecting a subject from harmful infrared light exposure comprising:
   one or more infrared light sources configured to illuminate the subject, the illumination varying according to a predetermined time sequence;
   a camera configured to capture images of the subject while the subject is illuminated by one of the light sources;
   a processor circuit configured to process the captured images to determine a brightness measure of the images; and
   a controller configured to control an output power of each of the infrared light sources based on the determined brightness measure, wherein, in response to the processor detecting the brightness measure of the images below a predetermined brightness threshold, the controller is configured to switch off or reduce an output illumination intensity of an infrared light source of the one or more infrared light sources that is deemed responsible for a reduction in the brightness measure;

wherein, in response to the processor detecting the brightness measure of the images above the predetermined brightness threshold, the controller is configured to maintain the output illumination intensity of the one or more infrared light sources;

wherein the brightness measure of the images below the predetermined brightness threshold indicates that the subject is too close to the one or more infrared light sources or the subject is occluded by an object in the images.

2. The monitoring system of claim 1, wherein determining a brightness measure includes determining an average pixel intensity of the images and using the determined average pixel intensity as the brightness measure.

3. The monitoring system of claim 1, wherein determining a brightness measure includes determining an average pixel intensity of a subset of the pixels of the images using the determined average pixel intensity as the brightness measure.

4. The monitoring system of claim 1, wherein the brightness measure is determined for a pixel region of the images, wherein the pixel region of the images corresponds to a face, an eye or both eyes of the subject.

5. The monitoring system of claim 1, wherein determining a brightness measure includes performing a comparison of brightness between two or more images and using a difference in brightness between the two or more images as the brightness measure.

6. The monitoring system of claim 1, wherein determining a brightness measure includes performing a comparison of brightness between sequential images and using a difference in brightness between sequential images as the brightness measure.

7. The monitoring system of claim 1, wherein determining a brightness measure includes performing a comparison of brightness between two images captured during illumination by a common infrared light source and using a difference in brightness between the two images as the brightness measure.

8. The monitoring system of claim 7, wherein performing the comparison includes comparing pixel intensities of two or more images on a pixel-by-pixel basis.

9. The monitoring system of claim 5, wherein performing the comparison includes comparing an average pixel intensity of the two or more images.

10. The monitoring system of claim 1, wherein the controller is further configured to perform operations including:
switching off an infrared light source for a predetermined delay period;
reactivating the infrared light source for a test period;
capturing one or more test images during the test period;
determining a brightness measure of the test images;
maintaining the infrared light source in an active state when the brightness measure of the test images is equal to or greater than the predetermined brightness threshold; and
deactivating the infrared light source when the brightness measure of the test images is less than the predetermined brightness threshold.

11. The monitoring system of claim 1, wherein at least one of the light sources is disposed at an angle of greater than 3.2 degrees from the camera relative to an optical axis defined between the subject and the camera.

12. The monitoring system of claim 1, wherein the controller is further configured to perform operations including:
determining that the brightness measure is below the predetermined brightness threshold; and
reducing the output illumination intensity and increasing an illumination period of the infrared light source,
wherein the reduced illumination intensity and increased illumination period are based on a determination of an illumination intensity and illumination period that are safe to the subject.

13. The monitoring system of claim 1, wherein the processor is further configured to determine a current value of the brightness measure to be a value corresponding to one of a plurality of predetermined brightness values, and
wherein the controller is configured to set the output illumination intensity of one of the infrared light sources to an illumination intensity corresponding to the determined current value of the brightness measure.

14. The monitoring system of claim 1, wherein the monitoring system is configured to be installed within a vehicle cabin, and
wherein the subject to be monitored is a driver of the vehicle.

15. A method of controlling a system of two or more infrared light sources for protecting a subject from harmful infrared light exposure, the method including:
illuminating the subject from two or more spaced apart infrared light sources according to a predetermined time sequence;
capturing images of the subject during periods in which the subject is illuminated by one of the two or more infrared light sources;
processing the captured images to determine a brightness measure of the images;
comparing the brightness measure to a predetermined brightness threshold; and
controlling an output power of the infrared light sources based on a comparison of the brightness measure to a predetermined brightness threshold,
wherein controlling the output power of the infrared light sources includes reducing or setting to zero an output illumination intensity of an infrared light source of the two or more infrared light sources that is deemed responsible for a reduction in the brightness measure, when the brightness measure is determined to be below the predetermined brightness threshold;
wherein controlling the output power of the infrared light sources includes, maintaining the output illumination intensity of the two or more infrared light sources when the brightness measure is determined to be above the predetermined brightness threshold;
wherein the brightness measure of the images below the predetermined brightness threshold indicates that the subject is too close to at least one of the two or more infrared light sources or the subject is occluded by an object in the images.

16. A method of controlling one or more infrared light sources for protecting a subject from harmful infrared light exposure, the method comprising:
controlling the one or more infrared light sources to illuminate the subject, the illumination varying according to a predetermined time sequence;

controlling a camera to capture images of the subject while the subject is illuminated by one of the one or more light sources;

processing the captured images to determine a brightness measure of the images;

controlling an output power of each of the infrared light sources based on the determined brightness measure, in response to detecting the brightness measure of the images below a predetermined brightness threshold, switching off or reducing an output illumination intensity of an infrared light source of the one or more infrared light sources that is deemed responsible for a reduction in the brightness measure;

in response to detecting the brightness measure of the images above the predetermined brightness threshold, maintaining the output illumination intensity of the one or more infrared light sources;

wherein the brightness measure of the images below the predetermined brightness threshold indicates that the subject is too close to the one or more infrared light sources or the subject is occluded by an object in the images.

* * * * *